Oct. 15, 1968  E. J. HALTER ET AL  3,405,511

VANE TYPE SEPARATOR

Filed May 16, 1966

Inventors:
Edmund J. Halter
Calvin L. Chance

By: Darbo, Robertson & Vandenburgh
Attys.

United States Patent Office 3,405,511
Patented Oct. 15, 1968

3,405,511
VANE TYPE SEPARATOR
Edmund J. Halter, Irving, and Calvin L. Chance, Leander, Tex., assignors to Burgess-Manning Company, Dallas, Tex., a corporation of Illinois
Filed May 16, 1966, Ser. No. 550,379
1 Claim. (Cl. 55—440)

ABSTRACT OF THE DISCLOSURE

A vane-type separator assembly for the inertial separation of entrained liquid particles from a stream of flowing gases comprises a stack of vane subassemblies establishing zig-zag passageways which are unobstructed and of uniform widths throughout their flow lengths, each subassembly providing vertical drainage channels into which particles may pass through slots.

---

This invention relates to separators for the removal of liquid particles entrained in gaseous streams. More particularly, the invention is concerned with improved vane structures for the centrifugal removal of liquid droplets and particles from gases flowing in zig-zag fashion through the vane separator structure.

Vane units for the separation of liquid particles entrained in gases are well-known and widely used. They provide relatively narrow zig-zag passageways which force a series of changes in the direction of flow of the gases conducted through the separator to effect concentration and removal of the liquid particles at each turn. Slots are provided in the walls of the passageways and small baffles extend upstream into the passageways after each turn and at the downstream edge of each slot to catch the particle concentrations and direct them through the slots and into vertical drainage channels.

The object of this invention is to provide an improved vane separator unit capable of more complete separation of the liquid particles from the flowing gases and which accomplishes this desired objective with even a lower pressure loss than has been experienced with prior structures of this type. A further object is to provide an improved and very simple vane assembly for the removal of very fine particles or mists from flowing gases in which the same are entrained.

The invention is fully described and exemplified in conjunction with the accompanying drawing, wherein FIG. 1 is a vertical, cross-sectional view of a complete separator assembly;

Figure 1:
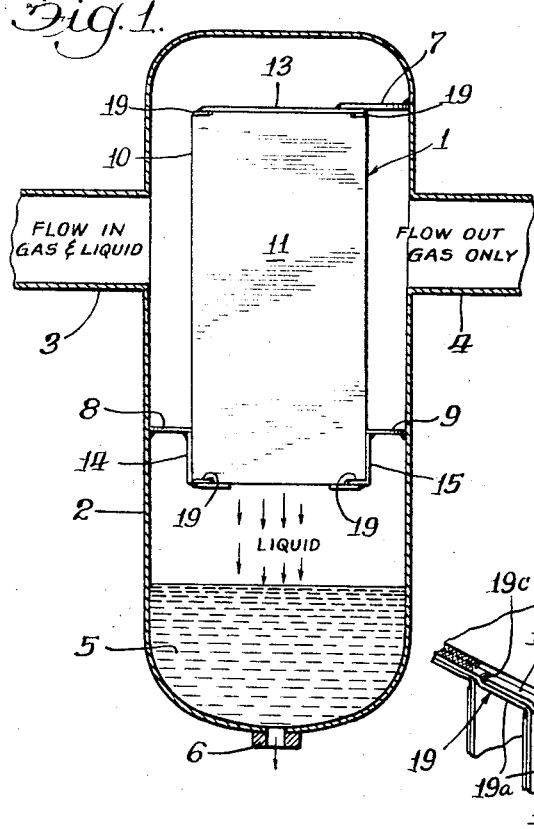

Vane assembly 1 is mounted for vertical orientation within a housing such as the cylindrical housing 2 which is provided with an inlet 3 and an outlet 4. As is indicated by the legends, the gas with entrained liquid particles is conducted into the housing through inlet 3 and the gas from which the particles have been separated pass from the separator through outlet 4. Sufficient volume is provided in the lower part of housing 2 for a liquid sump 5 from which the separated liquid is removed either continuously or at appropriate intervals through a liquid outlet 6. Vane assembly 1 is mounted in position within the housing by means of an upper plate 7 and lower plates 8 and 9 all of which are welded to the housing and to the vane assembly 1. These plates serve not only to support the vane assembly, but also to prevent by-passing of the gases from the inlet to the outlet, it being understood that the edges 10 of side plates 11 of the separator assembly are also welded to the housing. With this arrangement, gases flowing into the separator through inlet 3 must pass through the vane assembly 1 for treatment therein before reaching the outlet 4.

The separator vane assembly comprises a plurality of vane subassemblies 12 arranged in spaced, parallel juxtaposition and welded together to form a vane block or core, the particular configurations and arrangement of the vane parts being a feature in one aspect of the invention. Side plates 11, top plate 13 and closure plates 14 and 15 complete the vane assembly.

Each vane subassembly 12 comprises a basic segment 12a which extends as a single element throughout the flow length of the separator vane unit, an inlet segment 12b, intermediate segments 12c and 12d, and an outlet segment 12e. A plurality of the intermediate segments 12c and one each of the other segments are welded to the basic segment 12a in the arrangement shown to provide continuous vertical slots 16 for reception of the liquid particles as will be more fully described. This vane subassembly also provides vertically extending drainage channels 17 which are intended to receive the liquid through slots 16 and permit downward flow of the liquid within the channels through their open bottoms to the liquid sump 5 of the separator. Each such channel opens through a slot 16 to only one passageway; there can be no by-passing of gases from one passageway to the adjoining passageway through a drainage channel.

Adjoining vane subassemblies 12 define narrow zig-zag passageways 18 throughout the flow length of the separator vane assembly. It will be noted that each of these passageways is entirely unobstructed, being entirely free from the liquid trapping baffles or similar devices heretofore employed in vane separators of this type.

Describing, now, in detail, functional structural improvements and the improved mode of operation resulting therefrom, it is pointed out that gases with entrained liquid particles entering the separator assembly at the inlet end of passageway 18a (for example) is guided and directed in parallel flow to impinge upon surface 18b whereupon liquid droplets 18c adhere to and flow along the surface and leave the passageway and the gas stream through slot 18d to flow down through drainage channel 17a to liquid sump 5. The gases, relieved of a part of their liquid burden, continue along passageway 18a in guided and directed flow to impinge against surface 18e. Again, a part of the liquid particles adhere to this surface and exit from the gas passageway through slot 18f. This process continues at each succeeding turn in the passageway until the substantially liquid-free gases flow out of the downstream end of passageway 18a to the separator outlet 4.

The spacing between the separator vane subassemblies, which determines the width of the gas passageways 18, is such that the gas flow through the vane assembly is a controlled, parallel flow without excessive turbulence or interference. This is desirable because pressure losses resulting from flow of the gases through the vane assembly is thereby minimized, promoting more efficient flow through the vanes. Also, narrower passageways decrease the distance that the fine particles of liquid must flow cross-current at each turn to impinge upon a collecting vane surface. Although the spacing of the vane subassemblies, and, therefore, the widths of the passageways, is not critical, it is an important dimension for the more complete removal of finer particles. In general, the passageways should be as narrow as may be without unduly impeding the flow of gases with resulting inordinately high pressure drop through the separator. It has been found that widths of approximately 5/16 to 3/8 inch are satisfactory for fine particle removal.

The surfaces immediately upstream and downstream from the liquid outlet slots, such as surfaces 18e and 18g, should be substantially flush. There is necessarily some disturbance in the gas flow at each slot, but this is primarily contained in the slot opening and is minimized by the otherwise continuity of the passageway walls. A reasonable length of surface 18g—a length approximately equal to the width of the passageway—serves to assure maintenance of the guided and directed parallel flow in advance of the succeeding turn.

A further advantage realized from the low pressure loss characteristic of the vane separator structure of this invention is the minimizing of the by-passing of the vanes by passage of a portion of the gases through the liquid sump. High resistance in the separator structure tends to cause a part of the gases to flow downwardly just after they enter the vane structure and pass to the outlet zone of the vane structure through the space above the liquid in the liquid sump. Since such gases receive less treatment by the separating vanes, they retain a larger proportion of entrained particles and may even cause upward movement of gases in the liquid drainage channels at the outlet zone of the separator structure to interfere with separation. Furthermore, the stream of gases passing through the sump space will re-entrain particles of liquid as they drip from the bottom of the drainage channels.

Figure 4:
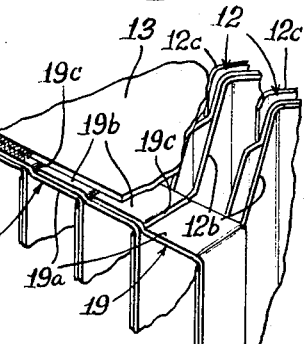
FIG. 4 is a detailed view of the upper inlet portion of the vane structure showing the construction and arrangement of vane elements, and taken at 4—4 of FIG. 2.
Figure 2:
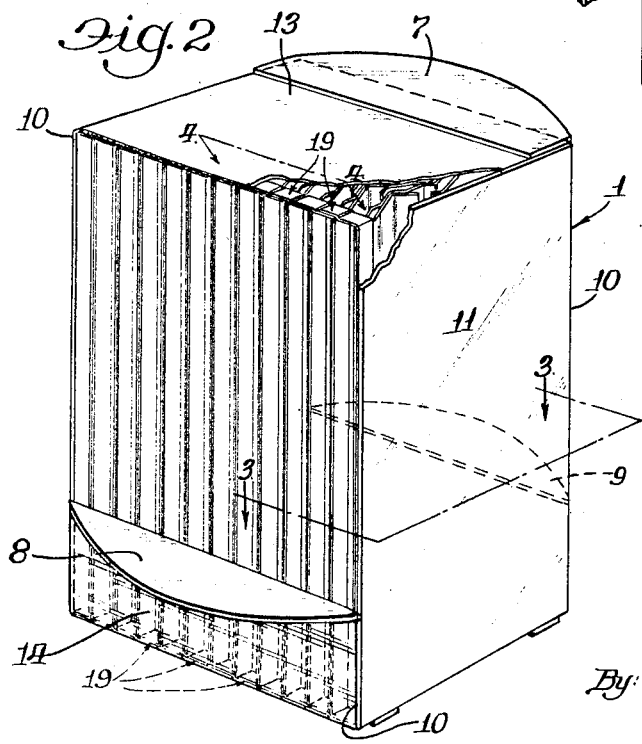
FIG. 2 is a perspective view, partly broken away, showing the vane assembly on an enlarged scale.
Figure 3:
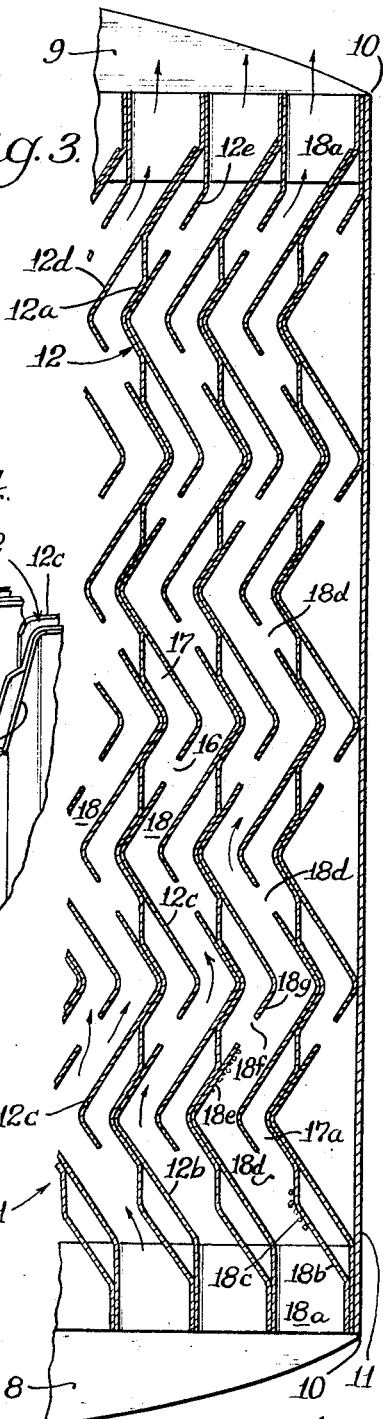
FIG. 3 is a cross-sectional view taken at the line 3—3 of FIG. 2 on a still larger scale.

Reverting to the mechanical details of construction of the vanes and vane assembly, a system has been provided for the interfitting of contiguous vane subassemblies, the automatic proper spacing to provide the desired passageway widths, and a simple, convenient and inexpensive arrangement for the welding of the entire vane assembly together into a single unit. Inlet and outlet segments 12b and 12e are provided with integral tabs for space gauging and support purposes. Referring particularly to FIG. 4, inlet segments 12b are provided with tabs 19 which extend at right angles from the end of the segment in a plane at right angles to the general plane of the segment. Each tab 19 is formed to provide surfaces at two different levels, surface 19a immediately adjoining the functioning portion of the vane segment being depressed an amount equal to the thickness of the metal of which the segment is made to receive the distal portion 19b of the segment of the adjacent vane assembly. Thus, the distal portion 19b of each tab 19 overlaps portion 19a of the vane segment, the end of the tab abutting shoulder 19c to establish the spacing between the vane subassemblies. The assembly of the collection of vane subassemblies provides a flush surface comprising the portions 19b of the tabs of all inlet segments 12b, providing an excellent surface for welding top plate 13 to at once secure the vane subassemblies together and the top plate to the vane assembly.

It will be understood that similar tabs are provided for outlet segments 12e so that in the vane assembly, the system and construction just described is employed at both inlet and outlet extremities of the vane assembly and at both the top and the bottom thereof, except that no plate is welded to the bottom of the unit, the tabs being welded to each other. The foregoing construction system creates an integrally welded structure, eliminating excessive parts employed in mechanical fastener construction.

It will be understood that the functional structure herein described may be achieved by mechanical means other than that specifically described by way of the exemplary embodiment illustrated in the drawing. For example, instead of fabricating the vane subassemblies from the several different segments to establish the slots, continuous sheets with slots punched from them may be used. Other alternative and fully equivalent forms of construction will occur to those skilled in the art.

The desirable high level of efficiency and low pressure loss which characterize the improved separator of this invention result from a combination of structural features. Reference has already been made to the unobstructed narrow passageways which promote controlled parallel flow with resulting low pressure loss and orderly and efficient movement of the liquid particles to the collecting surfaces and through the slots to the vertical drainage channels. These channels have bounding surfaces with junctures at acute angles which tend to promote retention of the liquid due to surface tension and collection at these zones of juncture. In addition to these positive efficiency factors, the structure of the invention also minimizes re-entrainment of liquid particles by eliminating any possibility of flow of gases through the drainage channels and minimizing flow of gases through the space of the liquid sump.

We claim:
1. In a separator for the removal of liquid particles entrained in gaseous streams, a vane assembly 1 comprising a plurality of vertically oriented vane subassemblies 12 arranged in spaced parallel juxtaposition and formed to define zig-zag passageways 18 therebetween to guide streams of gases therethrough with a plurality of turns in direction of flow whereby the gases are caused to impinge successively upon a plurality of vane surfaces, e.g., 18b, 18e, said vane subassembly comprising a basic segment 12a extending throughout the flow length of the vane assembly, an inlet segment 12b, a plurality of intermediate segments 12c, 12d and an outlet segment 12e; said inlet, intermediate and outlet segments being fastened to said basic segment to form the drainage channels and slots opening thereinto; the outer ends of said inlet and outlet segments having tabs, e.g. 19 integral respectively therewith and extending at right angles thereto; said tabs of adjoining vane subassemblies overlapping and fastened to each other to hold the vane assembly together in an integrally welded structure without mechanical fastening devices, each said tab being formed with a transverse shoulder 19c providing a stop to gauge the spacing of adjoining vane subassemblies, the portion of each tab underlying the overlapping portion of the tab of the adjoining vane subassembly being depressed enough to accommodate the thickness of the overlapping tab whereby the exposed surfaces of said tabs are substantially flush, each said vane subassembly forming a succession of vertical liquid drainage channels 17, a vertical slot 16 connecting each passageway with a drainage channel immediately downstream from each vane surface area of impingement, vane surfaces immediately upstream 18e and immediately downstream 18g from each slot being mutually flush, each said passageway being substantially unobstructed and of uniform width throughout its flow length, each said drainage channel being connected with only one passageway by only one slot.

References Cited
UNITED STATES PATENTS

| | | | |
|---|---|---|---|
| 1,999,246 | 4/1953 | Maret | 29—157.3 |
| 2,643,736 | 6/1953 | Smith | 55—440 |
| 2,720,938 | 10/1955 | Cates. | |
| 2,752,005 | 6/1956 | Avera et al. | 55—436 |
| 2,973,056 | 2/1961 | Sillen | 55—440 |
| 3,093,466 | 6/1963 | Zankey | 55—440 |
| 3,254,475 | 10/1966 | Farr et al. | 55—440 |

FOREIGN PATENTS

| | | |
|---|---|---|
| 257,368 | 3/1913 | Germany. |
| 615,363 | 7/1953 | Germany. |

HARRY B. THORNTON, *Primary Examiner.*

B. NOZICK, *Assistant Examiner.*